(12) United States Patent
Kawasato et al.

(10) Patent No.: US 8,287,828 B2
(45) Date of Patent: *Oct. 16, 2012

(54) PROCESS FOR PRODUCING LITHIUM-CONTAINING COMPOSITE OXIDE FOR POSITIVE ELECTRODE FOR LITHIUM SECONDARY BATTERY

(75) Inventors: Takeshi Kawasato, Chigasaki (JP); Naoshi Saito, Chigasaki (JP); Megumi Uchida, Chigasaki (JP); Kazushige Horichi, Chigasaki (JP); Koji Tatsumi, Chigasaki (JP); Kunihiko Terase, Chigasaki (JP); Manabu Suhara, Chigasaki (JP)

(73) Assignee: AGC Seimi Chemical Co., Ltd., Chigasaki (JP)

( * ) Notice: Subject to any disclaimer, the term of this patent is extended or adjusted under 35 U.S.C. 154(b) by 924 days.

This patent is subject to a terminal disclaimer.

(21) Appl. No.: 11/372,003

(22) Filed: Mar. 10, 2006

(65) Prior Publication Data

US 2006/0154146 A1    Jul. 13, 2006

Related U.S. Application Data

(63) Continuation of application No. PCT/JP2005/008240, filed on Apr. 28, 2005.

(30) Foreign Application Priority Data

Apr. 30, 2004 (JP) .................. 2004-136082
Sep. 14, 2004 (JP) .................. 2004-267250

(51) Int. Cl.
H01M 4/58 (2010.01)
H01M 4/50 (2010.01)
H01M 4/52 (2010.01)
C01D 15/00 (2006.01)

(52) U.S. Cl. ............ 423/179.5; 423/594; 423/598; 423/599; 423/600; 423/608; 423/625; 423/635; 423/641; 429/218.1; 429/223; 429/224; 429/231.1; 429/231.3; 429/231.95

(58) Field of Classification Search .............. 423/594, 423/598–600, 608, 625, 635, 641; 429/223, 429/218.1, 231.95, 224, 231.1, 231.3
See application file for complete search history.

(56) References Cited

U.S. PATENT DOCUMENTS

| | | | | |
|---|---|---|---|---|
| 4,778,671 A | * | 10/1988 | Wusirika | 423/592.1 |
| 5,742,070 A | * | 4/1998 | Hayashi et al. | 252/182.1 |
| 6,540,974 B2 | * | 4/2003 | Misra et al. | 423/600 |
| 6,569,569 B1 | * | 5/2003 | Kweon et al. | 429/231.1 |
| 6,589,457 B1 | * | 7/2003 | Li et al. | 264/44 |
| 6,589,694 B1 | * | 7/2003 | Gosho et al. | 429/231.1 |
| 6,749,965 B1 | * | 6/2004 | Kweon et al. | 429/231.1 |
| 2002/0037456 A1 | * | 3/2002 | Hosoya | 429/231.3 |
| 2002/0102204 A1 | * | 8/2002 | Kohiro et al. | 423/594 |
| 2003/0211235 A1 | * | 11/2003 | Suh et al. | 427/126.1 |

FOREIGN PATENT DOCUMENTS

| | | |
|---|---|---|
| CN | 1414650 A | 4/2003 |
| JP | 3-201368 | 9/1991 |
| JP | 03201368 A * | 9/1991 |
| JP | 6-243897 | 9/1994 |
| JP | 10-72219 | 3/1998 |
| JP | 10-312805 | 11/1998 |
| JP | 2000-340230 | 12/2000 |
| JP | 2001-23641 | 1/2001 |
| JP | 2001-28265 | 1/2001 |
| JP | 2002-60225 | 2/2002 |
| JP | 2002-170562 | 6/2002 |
| JP | 2003-68298 | 3/2003 |
| JP | 2003-178759 | 6/2003 |
| JP | 2004-119221 | 4/2004 |
| JP | 2004-193115 | 7/2004 |
| JP | 2004-265806 | 9/2004 |
| JP | 2005-123111 | 5/2005 |

OTHER PUBLICATIONS

Machine Translation of Tagami (JP2000-340230).*
Machine translation of Nozaki et al (JP 2000-260432).*
U.S. Appl. No. 11/625,060, filed Jan. 19, 2007, Saito, et al.
U.S. Appl. No. 12/175,652, filed Jul. 18, 2008, Suhara, et al.
U.S. Appl. No. 11/838,283, filed Aug. 14, 2007, Kawasato, et al.
U.S. Appl. No. 11/529,301, filed Sep. 29, 2006, Kawasato, et al.
U.S. Appl. No. 11/774,782, filed Jul. 9, 2007, Horichi, et al.
U.S. Appl. No. 11/365,617, filed Mar. 2, 2006, Kawasato, et al.
U.S. Appl. No. 11/621,586, filed Jan. 10, 2007, Suhara, et al.
U.S. Appl. No. 11/942,208, filed Nov. 19, 2007, Saito, et al.
U.S. Appl. No. 11/940,689, filed Nov. 15, 2007, Saito, et al.
U.S. Appl. No. 11/952,185, filed Dec. 7, 2007, Kawasato, et al.
U.S. Appl. No. 12/606,224, filed Oct 27, 2009, Uchida, et al.
U.S. Appl. No. 12/849,435, filed Aug. 3, 2010, Suhara, et al.

* cited by examiner

*Primary Examiner* — Melvin C Mayes
*Assistant Examiner* — Jun Li
(74) *Attorney, Agent, or Firm* — Oblon, Spivak, McClelland, Maier & Neustadt, L.L.P.

(57) ABSTRACT

A process for producing a lithium-containing composite oxide for a positive electrode active material for use in a lithium secondary battery, the oxide having the formula $Li_pQ_qN_xM_yO_zF_a$ (wherein Q is at least one element selected from the group consisting of titanium, zirconium, niobium and tantalum, N is at least one element selected from the group consisting of Co, Mn and Ni, M is at least one element selected from the group consisting of Al, alkaline earth metal elements and transition metal elements other than Q and N, $0.9 \leq p \leq 1.1$, $0 \leq q < 0.03$, $0.97 \leq x \leq 1.00$, $0 \leq y < 0.03$, $1.9 \leq z \leq 2.1$, $q+x+y=1$ and $0 \leq a \leq 0.02$), which comprises firing a mixture of a lithium, Q element source and N element sources, and an M element source and/or fluorine source when these elements are present, in an oxygen-containing atmosphere, wherein the Q element source is a Q element compound aqueous solution having a pH of from 0.5 to 11.

12 Claims, No Drawings

PROCESS FOR PRODUCING LITHIUM-CONTAINING COMPOSITE OXIDE FOR POSITIVE ELECTRODE FOR LITHIUM SECONDARY BATTERY

TECHNICAL FIELD

The present invention relates to a process for producing a lithium-containing composite oxide for a positive electrode for a lithium secondary battery, which has a large volume capacity density and high safety and is excellent in the charge and discharge cyclic durability and the low temperature characteristics, a positive electrode for a lithium secondary battery containing the produced lithium-containing composite oxide, and a lithium secondary battery.

BACKGROUND ART

Recently, as the portability and cordless tendency of instruments have progressed, a demand for a non-aqueous electrolyte secondary battery such as a lithium secondary battery which is small in size and light in weight and has a high energy density, has been increasingly high. As a positive electrode active material for the non-aqueous electrolyte secondary battery, a composite oxide of lithium and a transition metal such as $LiCoO_2$, $LiNiO_2$, $LiNi_{0.8}Co_{0.2}O_2$, $LiMn_2O_4$ or $LiMnO_2$, has been known.

Among them, a lithium secondary battery using a lithium-containing composite oxide ($LiCoO_2$) as a positive electrode active material and using a lithium alloy or carbon such as graphite or carbon fiber as a negative electrode, can operate at a high voltage at a level of 4V, whereby it has been widely used as a battery having a high energy density.

However, in the case of the non-aqueous type secondary battery using $LiCoO_2$ as a positive electrode active material, further improvement of the capacity density per unit volume of a positive electrode layer and the safety, has been desired. On the other hand, there has been a problem of deterioration of the cyclic properties such as gradual reduction of the battery discharge capacity due to repetitive charge and discharge cycle, a problem of the weight capacity density or substantial reduction of the discharge capacity at a low temperature.

In order to solve these problems, it has been proposed in Patent Document 1 that the average particle size of $LiCoO_2$ as a positive electrode active material, be from 3 to 9 μm, the volume occupied by a group of particles having a particle size of from 3 to 15 μm, be at least 75% of the total volume, and the intensity ratio of the diffraction peaks at 2θ=about 19° and 2θ=45° as measured by means of X-ray diffraction using CuKα as a radiation source, be of a specific value, so that it becomes an active material excellent in the coating properties, the self-discharge properties and the cyclic properties. Further, in Patent Document 1, it has been proposed that the positive electrode active material is preferably one which does not substantially have such a particle size distribution that the particle size of $LiCoO_2$ is 1 μm or smaller or 25 μm or larger. With such a positive electrode active material, the coating properties and the cyclic properties have been improved, but, the safety, the volume capacity density and the weight capacity density, have not yet been fully satisfactory.

Further, in order to solve the problem related to the battery characteristics, Patent Document 2 proposes to replace 5 to 35% of Co atoms with W, Mn, Ta, Ti or Nb to improve the cyclic properties. Further, Patent Document 3 proposes to use hexagonal $LiCoO_2$ as a positive electrode active material to improve the cyclic properties, wherein the c axis length of the lattice constant is at most 14.051 Å, and the crystal lattice size of (110) direction of the crystal lattice is from 45 to 100 nm.

Further, Patent Document 4 proposes that a lithium composite oxide of the formula $Li_xNi_{1-m}N_mO_2$ (wherein 0<x<1.1, 0≦m≦1), of which the primary particles are plate-like or columnar, the ratio of (volume standard cumulative 95% size–volume standard cumulative 5% size)/(volume standard cumulative 5% size) is at most 3, and further, the average particle size is from 1 to 50 μm, has a high initial discharge capacity per weight and further is excellent in the charge and discharge cyclic durability.

Further, Patent Document 5 proposes to lithiate a cobalt compound powder in the form of secondary particles with an average particle size of 0.5 to 30 μm formed by agglomeration of primary particles of cobalt hydroxide, cobalt oxyhydroxide or cobalt oxide with an average particle size of from 0.01 to 2 μm. However, also in this case, it is not possible to obtain a positive electrode material having a high volume capacity density, and further, the material is insufficient also with respect to the cyclic properties, the safety or the large current discharge properties.

As described above, in the prior art, with respect to a lithium secondary battery employing a lithium composite oxide as a positive electrode active material, it has not yet been possible to obtain one which sufficiently satisfies all of the volume capacity density, the safety, the coating uniformity, the cyclic properties and further the low temperature characteristics.

Patent Document 1: JP-A-6-243897
Patent Document 2: JP-A-3-201368
Patent Document 3: JP-A-10-312805
Patent Document 4: JP-A-10-72219
Patent Document 5: JP-A-2002-60225

DISCLOSURE OF THE INVENTION

It is an object of the present invention to provide a process for producing a lithium-containing composite oxide for a positive electrode for a lithium secondary battery, which has a large volume capacity density, high safety and a high average operating voltage, and is excellent in the charge and discharge cyclic durability and is further excellent in the low temperature characteristics, a positive electrode for a lithium secondary battery containing the produced lithium-containing composite oxide, and a lithium secondary battery.
Means of Solving the Problems The present inventors have conducted extensive studies and as a result, accomplished the present invention based on the following discoveries. A lithium-containing composite oxide such as lithium cobalt oxide is basically excellent in the volume capacity density. However, its crystal structure repeatedly expands and contracts by the phase transition between the hexagonal system and the monoclinic system accompanying the insertion and extraction of lithium at the time of charge and discharge, whereby the crystal structure will be broken, and the cyclic properties will be deteriorated. Heretofore, it has been attempted to overcome this problem, as mentioned above, by replacing a part of cobalt in the lithium cobalt oxide with a specific additional element such as W, Mn, Ta, Ti or Nb to stabilize the crystal structure. However, in the case of the above conventional method, an expected result has not necessarily been achieved as shown in Examples (Comparative Examples 2, 3, 5, 7, 13, 14, 15, 17, 19 and 21) as described hereinafter.

The present inventors have found that the above object can be achieved by selecting as an element which replaces cobalt, manganese or nickel (the N element in the present invention)

in the above lithium-containing composite oxide such as lithium cobalt oxide, at least one element (referred to as Q element in the present invention) selected from the group consisting of titanium, zirconium, niobium and tantalum, and by using an Q element source, an Q element-containing compound aqueous solution having a pH of from 0.5 to 11. In such a case, it is considered that the N element such as cobalt in the lithium-containing composite oxide is very sufficiently and uniformly replaced by the above Q element as a substituting element, whereby the above object is achieved.

Further, it has also been found that in the present invention, when at least one element (referred to as M element in the present invention) selected from the group consisting of Al, alkaline earth metal elements and transition metal elements other than cobalt, manganese and nickel is added as an addition element in addition to the above Q element, particularly when the M element is used in the form of an aqueous solution, a lithium-containing composite oxide for a lithium secondary battery, which has a large volume capacity density, high safety and a high average operating voltage and is excellent in the charge and discharge cyclic durability will be obtained.

Namely, the present invention is essentially directed to the following.

(1) A process for producing a lithium-containing composite oxide for a positive electrode for a lithium secondary battery, the lithium-containing composite oxide being represented by the formula $Li_pQ_qN_xM_yO_zF_a$ (wherein Q is at least one element selected from the group consisting of titanium, zirconium, niobium and tantalum, N is at least one element selected from the group consisting of Co, Mn and Ni, M is at least one element selected from the group consisting of Al, alkaline earth metal elements and transition metal elements other than Q and N, $0.9 \leq p \leq 1.1$, $0 < q \leq 0.03$, $0.97 \leq x < 1.00$, $0 \leq y < 0.03$, $1.9 \leq z \leq 2.1$, $q+x+y=1$ and $0 \leq a \leq 0.02$), which comprises firing a mixture of a lithium source, an Q element source and an N element source, and if necessary, at least one source selected from the group consisting of an M element source and a fluorine source, in an oxygen-containing atmosphere, characterized by using as the Q element source an Q element compound aqueous solution having a pH of from 0.5 to 11.

(2) The process according to the above (1), wherein the Q element compound aqueous solution is a titanium compound aqueous solution having a pH of from 1.0 to 9.5.

(3) The process according to the above (2), wherein the titanium compound aqueous solution is at least one aqueous solution selected from the group consisting of an aqueous solution of titanium lactate chelate and an aqueous solution of triethanolamine titanium chelate.

(4) The process according to the above (2), wherein the Q element source aqueous solution is an aqueous solution of any of zirconium, niobium and tantalum compounds, having a pH of from 2 to 11.

(5) The process according to the above (4), wherein the zirconium compound aqueous solution is at least one aqueous solution selected from the group consisting of an aqueous solution of zirconium ammonium carbonate and an aqueous solution of a halogenated zirconium ammonium.

(6) The process according to the above (4), wherein the niobium compound aqueous solution is at least one aqueous solution selected from the group consisting of an aqueous solution of a niobium alkoxide acetylacetonate and an aqueous solution of niobium hydrogenoxalate.

(7) The process according to the above (4), wherein the tantalum compound aqueous solution is an aqueous solution of a tantalum alkoxide acetylacetonate.

(8) The process according to the above (1), wherein the lithium source, the Q element compound aqueous solution and the N element source, and if necessary, at least one source selected from the group consisting of the M element source and the fluorine source are mixed, the water medium is removed from the obtained mixture, and the mixture is fired at from 800 to 1,080° C. in an oxygen-containing atmosphere.

(9) The process according to the above (1), wherein the Q element compound aqueous solution and the N element source, and if necessary, at least one source selected from the group consisting of the M element source and the fluorine source are mixed, the water medium is removed from the obtained mixture, and the mixture is mixed with the lithium source, and if necessary, at least one source selected from the group consisting of the M element source and the fluorine source, and the obtained mixture is fired at from 800 to 1,080° C. in an oxygen-containing atmosphere.

(10) The process according to the above (1), wherein a lithium composite oxide powder containing the N element source, and if necessary, at least one source selected from the group consisting of the M element source and the fluorine source is preliminarily prepared, the lithium composite oxide powder and the Q element compound aqueous solution, and if necessary, at least one source selected from the group consisting of the M element source and the fluorine source are mixed, the water medium is removed from the obtained mixture, and the mixture is fired at from 300 to 1,080° C. in an oxygen-containing atmosphere.

(11) The process according to any one of the above (1) to (10), wherein the M element source is an M element compound aqueous solution.

(12) The process according to any one of the above (1) to (11), wherein the M element is at least one member selected from the group consisting of Hf, Mg, Cu, Sn, Zn and Al.

(13) The process according to any one of the above (1) to (11), wherein the M element is Al and Mg, the Al/Mg atomic ratio is from 1/3 to 3/1, and $0.005 \leq y \leq 0.025$.

(14) The process according to any one of the above (1) to (12), wherein the M element is Mg, the Q element/Mg atomic ratio is from 1/40 to 2/1, and $0.005 \leq y \leq 0.025$.

(15) The process according to any one of the above (1) to (14), wherein the integral breadth of the diffraction peak on (110) plane at $2\theta=66.5\pm1°$ of the lithium-containing composite oxide is from 0.08 to 0.14 as measured by means of X-ray diffraction in which CuKα is used as a radiation source, and the surface area is from 0.2 to 0.7 m²/g.

(16) The process according to any one of the above (1) to (15), wherein the lithium-containing composite oxide has an average particle size of from 3 to 20 μm.

(17) A positive electrode for a lithium secondary battery containing a lithium-containing composite oxide produced by the process as defined in any one of the above (1) to (16).

(18) A lithium secondary battery using the positive electrode as defined in the above (17).

Effects of the Invention

According to the present invention, a lithium-containing composite oxide having excellent characteristics as a composite oxide for a positive electrode for a lithium secondary battery, such as a large volume capacity density, high safety and a high average operating voltage, excellent charge and discharge cyclic durability and excellent low temperature characteristics, can be obtained. Further, an excellent positive electrode for a lithium secondary battery containing the produced lithium-containing composite oxide and a lithium secondary battery are provided.

BEST MODE FOR CARRYING OUT THE INVENTION

The lithium-containing composite oxide for a positive electrode for a lithium secondary battery to be produced by the present invention is represented by the formula $Li_pQ_qN_xM_yO_zF_a$. In the formula, p, q, x, y, z and a are as defined above. Particularly, p, q, x, y, z and a are preferably as follows. $0.97 \leq p \leq 1.03$, 1, $0 < q \leq 0.03$, $0.97 \leq x < 1.00$, $0 \leq y < 0.03$, $1.95 \leq z \leq 2.1$, $q+x+y=1$ and $0 \leq a \leq 0.02$. Here, when a is larger than 0, it is a composite oxide having some of its oxygen atoms substituted by fluorine atoms. In such a case, the safety of the obtained positive electrode active material will be improved.

The N element is at least one element selected from the group consisting of Co, Mn and Ni, and it is preferably Co, Ni, Co and Ni, Mn and Ni, or Co, Ni and Mn. Further, the M element, also called an additional element in the present invention, is at least one element selected from the group consisting of Al, alkaline earth metals and transition metal elements other than the above Q element and N element. The transition metal elements represent transition metals of Group 4, Group 5, Group 6, Group 7, Group 8, Group 9, Group 10 and Group 11 of the Periodic Table. Among them, the M element is preferably at least one element selected from the group consisting of Hf, Mg, Cu, Sn, Zn and Al. Particularly, from the viewpoint of the volume development properties, the safety, the cyclic durability, etc., preferred is Hf, Mg or Al.

In the present invention, it is particularly preferred that the M element is Al and Mg, the Al/Mg atomic ratio is preferably from 1/3 to 3/1, particularly preferably from 2/3 to 3/2, and y is preferably $0.005 \leq y \leq 0.025$, particularly preferably $0.01 \leq y \leq 0.02$. In such a case, the battery performance i.e. the initial weight volume capacity density, the safety and the charge and discharge cyclic stability will be well balanced.

Further, in the present invention, it is particularly preferred that the M element is Mg, the atomic ratio of the Q element to Mg is preferably from 1/40 to 2/1, particularly preferably from 1/30 to 1/5, and y is preferably $0.005 \leq y \leq 0.025$, particularly preferably $0.01 \leq y \leq 0.02$. In such a case, the battery performance i.e. the initial weight capacity density, the initial volume capacity density, the safety and the charge and discharge cyclic stability will be well balanced.

In the present invention, in a case where the above at least one member selected from the group consisting of the M element and fluorine is contained, the M element is preferably present uniformly in the interior and on surface of the lithium-containing composite oxide particles. Further, fluorine is preferably present on the surface of the lithium-containing composite oxide particles. By the presence of fluorine on the surface, the battery performance will not be reduced by an addition of a small amount. Further, by the uniform presence of the M element in the interior and on the surface of the particles, important battery characteristics such as the safety and the charge and discharge cyclic properties can be improved. The presence of these elements on the surface can be judged by carrying out a spectroscopic analysis such as an XPS analysis with respect to the positive electrode particles.

In the present invention, the Q element is used in the form of an aqueous solution containing an Q element compound and having a pH of from 0.5 to 11. In a case where the Q element is a titanium compound, preferably a titanium compound aqueous solution having a pH of from 1.0 to 9.5 is used. The titanium compound may, for example, be preferably at least one member selected from the group consisting of titanium lactate chelate $(OH)_2Ti(C_3H_5O_3)_2$ and titanium triethanolamine chelate $(C_6H_{14}O_3N)_2-Ti(C_3H_7O)_2$.

Further, in a case where the Q element is a zirconium, niobium or tantalum compound, an aqueous solution containing each of the compounds and having a pH of from 2 to 11 is preferably used. The zirconium compound may, for example, be preferably at least one member selected from the group consisting of zirconium ammonium carbonate $(NH_4)_2[Zr(CO_3)_2(OH)_2]$, a halogenated zirconium ammonium $(NH_4)_2ZrX_6$ (wherein X is a halogen atom), basic zirconium carbonate and zirconium acetate. The niobium compound may, for example, be preferably a niobium alkoxide acetylacetonate such as niobium ethoxide acetylacetonate or niobium butoxide acetylacetonate, or niobium hydrogenoxalate: $Nb(HC_2O_4)_5$. The tantalum compound may, for example, be preferably a tantalum alkoxide acetylacetonate such as tantalum ethoxide acetylacetonate or tantalum butoxide acetylacetonate.

All the above exemplified Q element compounds have a high solubility in water and provide an aqueous solution having a high concentration. The concentration of the Q element compound aqueous solution is preferably high since it is necessary to remove the water medium by drying in the subsequent steps. However, if the concentration is too high, the viscosity tends to be high, and the uniform mixing properties with other element-containing compound powders forming the positive electrode active material tend to decrease. Thus, it is preferably from 1 to 30 mass %, particularly preferably from 4 to 20 mass %.

To a medium to form an aqueous solution of the Q element compound, if necessary, an organic acid such as citric acid, oxalic acid, lactic acid, tartaric acid, malic acid or malonic acid may be contained if necessary for the purpose of forming a complex or another purpose. The content of such an organic acid is preferably from 1 to 20 mass %.

As the N element source to be used in the present invention, in a case where the N element is cobalt, cobalt carbonate, cobalt hydroxide, cobalt oxyhydroxide or cobalt oxide is preferably used. Particularly preferred is cobalt hydroxide or cobalt oxyhydroxide, with which the performance is likely to be developed. Further, in a case where the N element is nickel, nickel hydroxide or nickel carbonate is preferably used. Further, in a case where the N element is manganese, manganese carbonate is preferably used.

Further, in a case where the N element source is a compound containing nickel and cobalt, $Ni_{0.8}Co_{0.2}OOH$ or $Ni_{0.8}Co_{0.2}(OH)_2$ may, for example, be preferably mentioned, in a case where the N element is a compound containing nickel and manganese, $Ni_{0.5}Mn_{0.5}OOH$ may, for example, be preferably mentioned, and in a case where the N element source is a compound containing nickel, cobalt and manganese, $Ni_{0.4}Co_{0.2}Mn_{0.4}(OH)_2$ or $Ni_{1/3}Co_{1/3}Mn_{1/3}OOH$ may, for example, be preferably mentioned.

As the lithium source to be used in the present invention, lithium carbonate or lithium hydroxide is preferably used. Particularly preferred is lithium carbonate which is available at a low cost. As the fluorine source, a metal fluoride is preferred, and LiF, $MgF_2$, etc. is particularly preferred.

The M element source to be used in the present invention may be an inorganic salt such as a solid oxide, hydroxide, carbonate or nitrate; an organic salt such as an acetate, oxalate, citrate, lactate, tartrate, malate or malonate; or an organic metal chelate complex or a compound having a metal alkoxide stabilized with e.g. a chelate. However, in the present invention, the M element source is preferably one which is uniformly soluble in the aqueous solution, more preferably a water soluble carbonate, a nitrate, an acetate, an oxalate, a citrate, a lactate or a tartrate. Among them, a citrate or a tartrate is preferred which has a high solubility. Further, in an aqueous oxalate or citrate solution having a low pH, a cobalt salt or the like may be dissolved in some cases, and in such a case, it is particularly preferred to add ammonia to the aqueous solution so as to make the solution be an aqueous solution having a pH of from 6 to 10.

In the present invention, as specific preferred means of producing a lithium-containing composite oxide by using the above Q element compound aqueous solution, the lithium source and the N element source, and at least one source selected from the group consisting of the M element source and the fluorine source to be used if necessary, the following means (A), (B) and (C) may be mentioned.

(A) The Q element compound aqueous solution, the lithium source and the N element source, and if necessary, at least one source selected from the group consisting of the M element source and the fluorine source are mixed, the water medium is removed from the obtained mixture, and the mixture is fired at from 800 to 1,080° C. in an oxygen-containing atmosphere.

(B) The Q element compound aqueous solution and the N element source, and if necessary, at least one source selected from the group consisting of the M element source and the fluorine source are mixed, the obtained mixture from which the water medium is removed, is mixed with the lithium source and if necessary, the M element source and the fluorine source, and the obtained mixture is fired at from 800 to 1,080° C. in an oxygen-containing atmosphere.

(C) A lithium composite oxide powder containing the N element and if necessary, at least one member selected from the group consisting of the M element and fluorine is preliminarily produced, the lithium composite oxide powder and an aqueous solution containing the Q element compound, and if necessary, at least one member selected from the group consisting of the M element source and fluorine, are mixed and the obtained mixture from which the water medium is removed, is fired at from 300 to 1,080° C. in an oxygen-containing atmosphere.

In the above means (A), (B) and (C), not only the M element source is used in the form of a powder but also an aqueous solution of the M element compound is preferably used as mentioned above. Further, in a case where the respective element sources are used as powders, the average particle size (D50) of each of these powders is not particularly limited, but is preferably from 0.1 to 20 μm, particularly preferably from 0.5 to 15 μm so that the powders are well mixed. The mixture ratio of each element is adjusted to achieve the desired ratio of each element within a range of the above $Li_pQ_qN_xM_yO_zF_a$ as the formula of the positive electrode active material to be produced in the present invention.

In the above means (A), (B) and (C), the aqueous solution of the Q element compound and other element source powders are mixed preferably sufficiently uniformly to form a slurry preferably by using an axial mixer or a paddle mixer. The solid content in the slurry is preferably high so long as the uniform mixing is achieved, but usually the solid/liquid ratio is suitably from 50/50 to 90/10, particularly preferably from 60/40 to 80/20.

Removal of the water medium from the obtained mixture is carried out by drying at preferably from 50 to 200° C., particularly preferably from 80 to 120° C. usually from 1 to 10 hours. The water medium in the mixture is not necessarily completely removed in this stage since it will be removed in the subsequent firing step, but it is preferably removed as far as possible since a large quantity of energy will be required to evaporate water in the firing step.

Firing after removal of the water medium is carried out, in the above means (A) and (B), at from 800 to 1,080° C. in an oxygen-containing atmosphere. If the firing temperature is lower than 800° C., formation of the lithium-containing composite oxide tends to be incomplete. On the other hand, if it exceeds 1,080° C., the charge and discharge cyclic durability and the initial capacity tend to be low. The firing temperature is particularly preferably from 900 to 1,080° C. Further, in the above means (C), firing may be carried out at a relatively low temperature since a lithium composite oxide powder has been already formed, and it is carried out from 300 to 1,080° C. in an oxygen-containing atmosphere.

With respect to the lithium-containing composite oxide thus produced, the average particle size D50 is preferably from 5 to 15 μm, particularly preferably from 8 to 12 μm, the specific surface area is preferably from 0.2 to 0.7 m$^2$/g, particularly preferably from 0.3 to 0.5 m$^2$/g, the half value width of the diffraction peak on (110) plane at $2\theta=66.5\pm1°$ as measured by means of X-ray diffraction in which CuKα is used as the radiation source, is preferably from 0.08 to 0.14°, particularly preferably from 0.08 to 0.120, and the press density is preferably from 3.05 to 3.50 g/cm$^3$, particularly preferably from 3.10 to 3.40 g/cm$^3$. Further, in the lithium-containing composite oxide of the present invention, the remaining alkali amount contained is preferably at most 0.03 mass %, particularly preferably at most 0.01 mass %. In the present invention, the press density means the apparent density when the lithium composite oxide powder is pressed under 0.3 t/cm$^2$.

In a case where a positive electrode for a lithium secondary battery is produced from such a lithium-containing composite oxide, it is formed by mixing the powder of such a composite oxide with a binder material and a carbon type electroconductive material such as acetylene black, graphite or ketjenblack. As the above binder material, polyvinylidene fluoride, polytetrafluoroethylene, polyamide, carboxymethyl cellulose or an acrylic resin may, for example, be preferably employed. The powder of the lithium-containing composite oxide of the present invention, the electroconductive material and the binding material are formed into a slurry or a kneaded product by using a solvent or a dispersion medium, which is supported on a positive electrode current collector such as an aluminum foil or a stainless steel foil by e.g. coating to form a positive electrode for a lithium secondary battery.

In a lithium secondary battery using the lithium-containing composite oxide of the present invention as the positive electrode active material, e.g. a film of a porous polyethylene or a porous polypropylene may be used as the separator. Further, as the solvent of the electrolytic solution of the battery, various solvents may be used. However, a carbonate ester is preferred. As the carbonate ester, each of a cyclic type and a chain type can be used. As the cyclic carbonate ester, propylene carbonate or ethylene carbonate (EC) may, for example, be mentioned. As the chain carbonate ester, dimethyl carbonate, diethyl carbonate (DEC), ethyl methyl carbonate (EMC), methyl propyl carbonate or methyl isopropyl carbonate may, for example, be mentioned.

In the present invention, the carbonate ester may be used alone or by mixing at least two types. Further, it may be used by mixing with another solvent. Further, according to the material of the negative electrode active material, if the chain carbonate ester is used together with the cyclic carbonate ester, there is a case where the discharge properties, the cyclic durability or the charge and discharge efficiency can be improved.

Further, in the lithium secondary battery using the lithium-containing composite oxide of the present invention as the positive electrode active material, a gel polymer electrolyte containing a vinylidene fluoride-hexafluoropropylene copolymer (for example, KYNAR manufactured by ELF Atochem) or a vinylidene fluoride-perfluoropropyl vinyl ether copolymer may be employed. As the solute to be added to the electrolytic solvent or the polymer electrolyte, at least one member of lithium salts is preferably used, wherein e.g. $ClO_4^-$, $CF_3SO_3^-$, $BF_4^-$, $PF_6^-$, $AsF_6^-$, $SbF_6^-$, $CF_3CO_2^-$ or $(CF_3SO_2)_2N^-$ is anion. The lithium salt as the solute is preferably added at a concentration of from 0.2 to 2.0 mol/L (liter) to the electrolytic solvent or the polymer electrolyte. If the concentration departs from this range, ionic conductivity will decrease, and the electrical conductivity of the electrolyte will decrease. More preferably, it is from 0.5 to 1.5 mol/L.

In the lithium battery using the lithium-containing composite oxide of the present invention as the positive electrode active material, as the negative electrode active material, a material which can occlude and discharge lithium ions may be used. The material forming the negative electrode active material is not particularly limited, however, lithium metal, a lithium alloy, a carbon material, an oxide comprising, as a main body, a metal of Group 14 or Group 15 of the Periodic Table, a carbon compound, a silicon carbide compound, a silicone oxide compound, titanium sulfide or a boron carbide compound may, for example, be mentioned. As the carbon material, an organic material which is subjected to thermal decomposition under various thermal decomposition conditions, artificial graphite, natural graphite, soil graphite, exfoliated graphite or squamation graphite etc. can be used. Further, as the oxide, a compound comprising tin oxide as a main body can be used. As the negative electrode current collector, a copper foil, a nickel foil etc. can be used. The negative electrode is produced preferably by kneading the active material with an organic solvent to form a slurry, which is coated on the metal foil current collector, dried and pressed.

The shape of the lithium battery using the lithium-containing composite oxide of the present invention as the positive electrode active material is not particularly limited. Sheet, film, folding, winding type cylinder with bottom or button shape etc. is selected according to use.

EXAMPLES

Now, the present invention will be explained in further detail with reference to Examples. However, the present invention is by no means restricted to such specific Examples.

Example 1

A mixed solution of a cobalt sulfate aqueous solution with ammonium hydroxide and a caustic soda aqueous solution were continuously mixed, whereby a cobalt hydroxide slurry was continuously prepared by a known method, followed by steps of agglomeration, filtration and drying to obtain a cobalt hydroxide powder. As measured by means of powder X-ray diffraction in which CuKα ray was used, of the obtained cobalt hydroxide, the half value width of the diffraction peak on (001) plane at $2\theta=19\pm1°$ was 0.27°, and the half value width of the diffraction peak on (101) plane at $2\theta=38°\pm1$ was 0.23°. As a result of observation by scanning electron microscope, the particles were found to be ones having fine particles agglomerated to form substantially spherical secondary particles.

As a result of particle size distribution analysis on the volume basis calculated from image analysis of observation by scanning electron microscope, the average particle size D50 was 13.5 μm, D10 was 6.7 μm and D90 was 18.5 μm. The cobalt content of cobalt hydroxide was 61.0%.

196.47 g of the above cobalt oxide and 75.86 g of a lithium carbonate powder having a specific surface area of 1.2 m²/g were mixed.

On the other hand, 5.97 g of a titanium lactate $(OH)_2Ti(C_3H_5O_3)_2$ aqueous solution having a Ti content of 8.2 mass % was mixed with a solution having 2.86 g of citric acid dissolved in 71.17 g of water, followed by stirring for 30 minutes to obtain a titanium compound aqueous solution having a pH of 1. The aqueous solution was added to the above mixture of cobalt hydroxide with lithium carbonate and formed into a slurry.

The slurry was dehydrated in a dryer at 120° C. for 2 hours and then fired in the air at 950° C. for 12 hours to obtain $LiCo_{0.995}Ti_{0.005}O_2$. The fired product was crushed, and the particle size distribution of a lithium-containing composite oxide powder formed by agglomeration of primary particles was measured in a water solvent by using a laser scattering type particle size distribution measuring apparatus and as a result, the average particle size D50 was 14.0 μm, D10 was 6.6 μm and D90 was 18.0 μm, and a substantially spherical lithium-containing composite oxide powder having a specific surface area of 0.33 m²/g as measured by means of BET method, was obtained.

With respect to the lithium-containing composite oxide powder, an X-ray diffraction spectrum was obtained by using an X-ray diffraction apparatus (RINT2100 model, manufactured by Rigaku Corporation). In powder X-ray diffraction in which CuKα ray was used, the half value width of the diffraction peak on (110) plane at $2\theta=66.5\pm1°$ was 0.110°. The press density of this powder was 3.11 g/cm³. 10 g of the lithium-cobalt composite oxide powder was dispersed in 100 g of pure water, and after filtration, the remaining alkali amount was obtained by potentiometric titration with 0.1 N HCl and found to be 0.02 mass %.

The above lithium-containing composite oxide powder, acetylene black and a polyvinylidene fluoride powder were mixed in a mass ratio of 90/5/5, and N-methylpyrrolidone was added to form a slurry, which was applied on one side of an aluminum foil with a thickness of 20 μm by a doctor blade. After drying, roll pressing was carried out five times to obtain a positive electrode sheet for a lithium battery.

Using one punched out from the positive electrode sheet as a positive electrode, using a metal lithium foil having a thickness of 500 μm as a negative electrode, using a nickel foil of 20 μm as a negative electrode current collector, using a porous polypropylene having a thickness of 25 μm as a separator and using a $LiPF_6$/EC+DEC(1:1) solution (it means a mixed solution of EC and DEC in a mass ratio (1:1) of which the solute is $LiPF_6$, the same applies to solvents as mentioned hereinafter) at a concentration of 1M as an electrolytic solution, a pair of simplified sealed cell type lithium batteries made of stainless steel were assembled in an argon grove box.

A piece of the battery was charged up to 4.3 V at a load current of 75 mA per 1 g of the positive electrode active material at 25° C., and discharged down to 2.5 V at a load current of 75 mA per 1 g of the positive electrode active material, whereby the initial discharge capacity was obtained. Further, the density of the electrode layer was measured. Further, the charge and discharge cyclic test was sequentially carried out 30 times by use of this battery. As a result, the initial weight capacity density of the positive electrode layer at from 2.5 to 4.3 V at 25° C. was 163 mAh/g, and the average discharge voltage was 3.98 V and the capacity retention was 98.5% after 30 times of charge and discharge cycle.

Further, the other battery was charged for 10 hours at 4.3 V, and then disassembled in the argon grove box. The positive electrode sheet was taken out after charge, and after the positive electrode sheet was washed, it was punched out at a diameter of 3 mm, and then sealed in an aluminum capsule with EC. And then, it was heated at a rate of 5° C./min by using a scanning differential calorimeter, whereby the heat generation starting temperature was measured. As a result, the heat generation starting temperature of the 4.3 V charged material was 162° C.

Example 2

Comparative Example

A lithium-containing oxide was synthesized in the same manner as in Example 1 except that no titanium compound aqueous solution was added by blending to result in $LiCoO_2$ after firing. As a result, an aggregated $LiCoO_2$ powder having an average particle size D50 of 13.3 µm, D10 of 6.8 µm and D90 of 18.2 µm, and a specific surface area of 0.30 m$^3$/g as measured by BET method, was obtained. With respect to the $LiCoO_2$ powder, an X-ray diffraction spectrum was obtained by using an X-ray diffraction apparatus (RINT 2100 model, manufactured by Rigaku Corporation). In powder X-ray diffraction using CuKα ray, the half value width of the diffraction peak on (110) plane in the vicinity of $2\theta=66.5\pm1°$ was 0.114°. The press density of the obtained $LiCoO_2$ powder was 3.08 g/cm$^3$.

In the same manner as in Example 1, a positive electrode body was produced, batteries were assembled, and the characteristics were measured. The initial weight capacity density of the positive electrode layer was 161 mAh/g, the average discharge voltage was 3.94 V and the capacity retention was 96.0% after 30 times of charge and discharge cycle. The heat generation starting temperature of the 4.3 V charged material was 157° C.

Example 3

Comparative Example

A lithium-containing composite oxide blended to be was synthesized in the same manner as in Example 1 except that 0.82 g of a titanium oxide powder was used instead of the titanium compound aqueous solution by blending to result in $LiCo_{0.995}Ti_{0.005}O_2$ after firing. As a result, an aggregated lithium-containing composite oxide powder having an average particle size D50 of 13.6 µm, D10 of 7.1 µm and D90 of 18.8 µm, and a specific surface area of 0.33 m$^2$/g as measured by BET method, was obtained. With respect to this powder, an X-ray diffraction spectrum was obtained by using an X-ray diffraction apparatus (RINT 2100 model, manufactured by Rigaku Corporation). In powder X-ray diffraction using CuKα ray, the half value width of the diffraction peak on (110) plane in the vicinity of $2\theta=66.5\pm1°$ was 0.120°. The press density of the obtained lithium-containing composite oxide powder was 3.00 g/cm$^3$.

Further, in the same manner as in Example 1, a positive electrode was produced, batteries were assembled, and the characteristics were measured. The initial weight capacity density of the positive electrode layer was 160 mAh/g, the average discharge voltage was 3.95 V and the capacity retention was 97.5% after 30 cycles, and the heat generation starting temperature was 159° C.

Example 4

194.57 g of a cobalt hydroxide powder and 76.44 g of a lithium carbonate powder were mixed. On the other hand, 2.41 g of a titanium lactate $(OH)_2Ti(C_3H_5O_3)_2$ aqueous solution having a Ti content of 8.2 mass % was added to a liquid having 3.12 g of a basic aluminum lactate powder, 1.98 g of a magnesium carbonate powder and 14.86 g of citric acid dissolved in 57.64 g of water to obtain an aqueous solution (additional element solution) having a pH of 2.3. A lithium-containing composite oxide of $LiAl_{0.01}Co_{0.978}Mg_{0.01}Ti_{0.002}O_2$ was synthesized in the same manner as in Example 1 except that the above aqueous solution was added to the above mixture of cobalt hydroxide with lithium carbonate to form a slurry.

As a result, an aggregated lithium-containing composite oxide powder having an average particle size D50 of 13.1 µm, D10 of 6.9 µm and D90 of 18.5 µm, and a specific surface area of 0.29 m$^2$/g as measured by BET method, was obtained. With respect to this powder, an X-ray diffraction spectrum was obtained by using an X-ray diffraction apparatus (RINT 2100 model, manufactured by Rigaku Corporation). In powder X-ray diffraction using CuKα ray, the half value width of the diffraction peak on (110) plane in the vicinity of $2\theta=66.5\pm1°$ was 0.111°. The press density of the obtained lithium-containing composite oxide powder was 3.14 g/cm$^3$.

Further, in the same manner as in Example 1, a positive electrode was produced, batteries were assembled, and the characteristics were measured. The initial weight capacity density of the positive electrode layer was 162 mAh/g, the average discharge voltage was 3.97 V and the capacity retention was 99.2% after 30 cycles, and the heat generation starting temperature was 173° C.

Example 5

Comparative Example

A lithium-containing composite oxide was obtained in the same manner as in Example ≦ except that 1.20 g of a magnesium hydroxide powder, 1.61 g of an aluminum hydroxide powder and 0.33 g of a titanium oxide powder were used instead of the additional element solution by blending to result in $LiAl_{0.01}Co_{0.978}Mg_{0.01}Ti_{0.002}O_2$ after firing. As a result, an aggregated lithium-containing composite oxide powder having an average particle size D50 of 13.0 µm, D10 of 6.8 µm and D90 of 18.6 µm, and a specific surface area of 0.35 m2/g as measured by BET method, was obtained.

With respect to this powder, an X-ray diffraction spectrum was obtained by using an X-ray diffraction apparatus (RINT 2100 model, manufactured by Rigaku Corporation). In powder X-ray diffraction using CuKα ray, the half value width of the diffraction peak on (110) plane in the vicinity of $2\theta=66.5\pm1°$ was 0.121°. The press density of the obtained lithium-containing composite oxide powder was 3.05 g/cm$^3$.

Further, in the same manner as in Example 1, a positive electrode was produced, batteries were assembled, and the characteristics were measured. The initial weight capacity density of the positive electrode layer was 162 mAh/g, the average discharge voltage was 3.95 V and the capacity retention was 98.6% after 30 cycles, and the heat generation starting temperature was 165° C.

Example 6

95.72 g of $LiCoO_2$ synthesized in Example 2 and 37.69 g of the additional element solution prepared in Example 4 were mixed and formed into a slurry. The slurry from which the solvent was removed, was fired in the air at 900° C. for 12 hours to obtain a lithium-containing composite oxide of $Li_{0.978}Al_{0.01}Co_{0.978}Mg_{0.01}Ti_{0.002}O_2$. As a result, an aggregated lithium-containing composite oxide powder having an average particle size D50 of 13.3 μm, D10 of 7.0 μm and D90 of 18.4 μm, and a specific surface area of 0.31 m$^2$/g as measured by BET method, was obtained. With respect to this powder, an X-ray diffraction spectrum was obtained by using an X-ray diffraction apparatus (RINT 2100 model, manufactured by Rigaku Corporation). In powder X-ray diffraction using CuKα ray, the half value width of the diffraction peak on (110) plane in the vicinity of 2θ=66.5±1° was 0.117°. The press density of the obtained lithium-containing composite oxide powder was 3.08 g/cm$^3$.

Further, in the same manner as in Example 1, a positive electrode was produced, batteries were assembled, and the characteristics were measured. The initial weight capacity density of the positive electrode layer was 159 mAh/g, the average discharge voltage was 3.96 V and the capacity retention was 99.3% after 30 cycles, and the heat generation starting temperature was 169° C.

Example 7

Comparative Example

In Example 6, 0.78 g of an aluminum hydroxide powder, 0.58 g of a magnesium hydroxide powder and 0.16 g of a titanium oxide powder were mixed instead of using the additional element solution, and the mixture was fired in the air at 900° C. for 12 hours to obtain a lithium-lithium-cobalt composite oxide of $Li_{0.978}Al_{0.01}Co_{0.978}Mg_{0.01}Ti_{0.002}O_2$ was obtained. As a result, an aggregated lithium-containing composite oxide powder having an average particle size D50 of 13.5 μm, D10 of 7.2 μm and D90 of 18.3 μm, and a specific surface area of 0.37 m$^2$/g as measured by BET method, was obtained. With respect to this powder, an X-ray diffraction spectrum was obtained by using an X-ray diffraction apparatus (RINT 2100 model, manufactured by Rigaku Corporation). In powder X-ray diffraction using CuKα ray, the half value width of the diffraction peak on (110) plane in the vicinity of 2θ=66.5±1° was 0.125°. The press density of the obtained lithium-containing composite oxide powder was 2.98 g/cm$^3$.

Further, in the same manner as in Example 1, a positive electrode was produced, batteries were assembled, and the characteristics were measured. The initial weight capacity density of the positive electrode layer was 157 mAh/g, the average discharge voltage was 3.95 V and the capacity retention was 96.7% after 30 cycles, and the heat generation starting temperature was 162° C.

Example 8

2.41 g of a titanium lactate $(OH)_2Ti(C_3H_5O_3)_2$ aqueous solution having a Ti content of 8.2 mass % was added to a solution having 3.12 g of a basic aluminum lactate powder, 1.98 g of a magnesium carbonate powder and 14.86 g of citric acid dissolved in 57.64 g of water, to obtain an additional element solution having a pH of 2.3. The additional element solution was added to 194.57 g of a cobalt hydroxide powder to obtain a slurry, which was dehydrated in a dryer at 120° C. for 2 hours and then mixed with 76.44 g of lithium carbonate, and the mixture was fired at 95° C. for 12 hours to obtain a lithium-containing composite oxide of $LiAl_{0.01}Co_{0.978}Mg_{0.01}Ti_{0.002}O_2$.

As a result, an aggregated lithium-containing composite oxide powder having an average particle size D50 of 13.1 μm, D10 of 7.0 μm and D90 of 18.1 μm, and a specific surface area of 0.29 m$^2$/g as measured by BET method, was obtained. With respect to this powder, an X-ray diffraction spectrum was obtained by using an X-ray diffraction apparatus (RINT 2100 model, manufactured by Rigaku Corporation). In powder X-ray diffraction using CuKα ray, the half value width of the diffraction peak on (110) plane in the vicinity of 2θ=66.5±1° was 0.108°. The press density of the obtained lithium-containing composite oxide powder was 3.15 g/cm$^3$.

Further, in the same manner as in Example 1, a positive electrode was produced, batteries were assembled, and the characteristics were measured. The initial weight capacity density of the positive electrode layer was 162 mAh/g, the average discharge voltage was 3.97 V and the capacity retention was 99.1% after 30 cycles, and the heat generation starting temperature was 175° C.

Example 9

12.03 g of a triethanolamine titanium chelate $(C_6H_{14}O_3N)_2$—$Ti(C_3H_7O)_2$ aqueous solution having a Ti content of 8.2 mass % was added to a solution having 3.11 g of a basic aluminum lactate powder, 1.95 g of a magnesium carbonate powder and 16.45 g of tartaric acid dissolved in 46.47 g of water, to obtain an additional element solution having a pH of 3.0. The additional element solution was added to 193.03 g of a cobalt hydroxide powder to obtain a slurry, which was dehydrated in a dryer at 120° C. for 2 hours and then mixed with 76.44 g of lithium carbonate, and the mixture was fired at 950° C. for 12 hours to obtain a lithium-containing composite oxide of $LiAl_{0.01}Co_{0.97}Mg_{0.01}Ti_{0.01}O_2$.

As a result, an aggregated lithium-containing composite oxide powder having an average particle size D50 of 13.5 μm, D10 of 6.7 μm and D90 of 18.7 μm, and a specific surface area of 0.30 m$^2$/g as measured by BET method, was obtained. With respect to this powder, an X-ray diffraction spectrum was obtained by using an X-ray diffraction apparatus (RINT 2100 model, manufactured by Rigaku Corporation). In powder X-ray diffraction using CuKα ray, the half value width of the diffraction peak on (110) plane in the vicinity of 2θ=66.5±1° was 0.109°. The press density of the obtained lithium-containing composite oxide powder was 3.12 g/cm$^3$.

Further, in the same manner as in Example 1, a positive electrode was produced, batteries were assembled, and the characteristics were measured. The initial weight capacity density of the positive electrode layer was 161 mAh/g, the average discharge voltage was 3.98 V and the capacity retention was 99.3% after 30 cycles, and the heat generation starting temperature was 174° C.

Example 10

Based on 194.57 g of a cobalt hydroxide powder, as an additional liquid, 2.41 g of a titanium lactate $(OH)_2Ti(C_3H_5O_3)_2$ aqueous solution having a Ti content of 8.2 mass % was added to a solution having 3.12 g of a basic aluminum lactate powder, 1.98 g of a magnesium carbonate powder and 14.86 g of citric acid dissolved in 57.64 of water. The additional element solution had a pH of 2.5. The obtained slurry was dehydrated in a dryer at 120° C. for 2 hours and mixed with 76.04 g of lithium carbonate and 0.26 g of lithium fluoride, and the mixture was fired at 950° C. for 12 hours to obtain a lithium-containing composite oxide of $LiAl_{0.01}Co_{0.978}Mg_{0.01}Ti_{0.002}O_{1.995}F_{0.005}$. As a result, an aggregated lithium-containing composite oxide powder having an average particle size D50 of 13.5 μm, D10 of 6.9 μm and D90 of 18.9 μm, and a specific surface area of 0.33 m$^2$/g as measured by BET method, was obtained.

With respect to this powder, an X-ray diffraction spectrum was obtained by using an X-ray diffraction apparatus (RINT 2100 model, manufactured by Rigaku Corporation). In powder X-ray diffraction using CuKα ray, the half value width of the diffraction peak on (110) plane in the vicinity of $2\theta=66.5\pm1°$ was 0.107°. The press density of the obtained lithium-containing composite oxide powder was 3.15 g/cm$^3$.

Further, in the same manner as in Example 1, a positive electrode was produced, batteries were assembled, and the characteristics were measured. The initial weight capacity density of the positive electrode layer was 161 mAh/g, the average discharge voltage was 3.98 V and the capacity retention was 99.0% after 30 cycles, and the heat generation starting temperature was 177° C.

Example 11

A mixed solution of a cobalt sulfate aqueous solution with ammonium hydroxide and a caustic soda aqueous solution were continuously mixed, whereby a cobalt hydroxide slurry was continuously prepared by a known method, followed by steps of agglomeration, filtration and drying to obtain a cobalt hydroxide powder. As measured by means of powder X-ray diffraction in which CuKα ray was used as a radiation source, of the obtained cobalt hydroxide, the half value width of the diffraction peak on (001) plane at $2\theta=19\pm1°$ was 0.27°, the half value width of the diffraction peak on (101) plane at $2\theta=38°\pm1$ was 0.23°. As a result of observation by scanning electron microscope, the particles were found to be ones having fine particles agglomerated to form substantially spherical secondary particles. As a result of particle size distribution analysis on the volume basis calculated from image analysis of observation by scanning electron microscope, the average particle size D50 was 17.5 μm, D10 was 7.1 μm and D90 was 26.4 μm. The cobalt content of cobalt hydroxide was 61.5%.

193.07 g of the above cobalt hydroxide and 75.66 g of a lithium carbonate powder having a specific surface area of 1.2 m$^2$/g were mixed.

On the other hand, 12.29 g of a zirconium ammonium carbonate $(NH_4)_2[Zr(CO_3)_2(OH)_2]$ aqueous solution having a Zr content of 15.1 mass % was mixed with 67.71 g of water, followed by stirring for 30 minutes to obtain an additional element solution having a pH of 9.0. The above solution was added to the above mixture of cobalt hydroxide with lithium carbonate and formed into a slurry.

The slurry was dehydrated in a dryer at 120° C. for 2 hours and then fired in the air at 950° C. for 12 hours to obtain $LiCo_{0.99}Zr_{0.01}O_2$. The fired product was crushed, and the particle size distribution of a lithium-containing composite oxide powder formed by agglomeration of primary particles was measured in a water solvent by using a laser scattering type particle size distribution measuring apparatus and as a result, the average particle size D50 was 17.1 μm, D10 was 7.3 μm and D90 was 26.0 μm, and a substantially spherical lithium-containing composite oxide powder having a specific surface area of 0.31 m$^2$/g as measured by means of BET method, was obtained. With respect to the lithium-containing composite oxide powder, an X-ray diffraction spectrum was obtained by using an X-ray diffraction apparatus (RINT2100 model, manufactured by Rigaku Corporation). In powder X-ray diffraction in which CuKα ray was used, the half value width of the diffraction peak on (110) plane at $2\theta=66.5\pm1°$ was 0.116°. The press density of this powder was 3.07 g/cm$^3$. 10 g of the lithium-cobalt composite oxide powder was dispersed in 100 g of pure water, and after filtration, the remaining alkali amount was determined by potentiometric titration with 0.1 N HCl and found to be 0.02 mass %.

The above lithium-containing composite oxide powder, acetylene black and a polyvinylidene fluoride powder were mixed in a mass ratio of 90/5/5, and N-methylpyrrolidone was added to form a slurry, which was applied on one side of an aluminum foil with a thickness of 20 μm by a doctor blade. After drying, roll pressing was carried out five times to obtain a positive electrode sheet for a lithium battery.

Using one punched out from the positive electrode sheet as a positive electrode, using a metal lithium foil having a thickness of 500 μm as a negative electrode, using a nickel foil of 20 μm as a negative electrode current collector, using a porous polypropylene having a thickness of 25 μm as a separator and using a LiPF$_6$/EC+DEC(1:1) solution (it means a mixed solution of EC and DEC in a mass ratio (1:1) of which the solute is LiPF$_6$, the same applies to solvents as mentioned hereinafter) at a concentration of 1M as an electrolytic solution, a pair of simplified sealed cell type lithium batteries made of stainless steel were assembled in an argon grove box.

A piece of the battery was charged up to 4.3 V at a load current of 75 mA per 1 g of the positive electrode active material at 25° C., and discharged down to 2.5 V at a load current of 75 mA per 1 g of the positive electrode active material, whereby the initial discharge capacity was obtained. Further, the density of the electrode layer was obtained. Further, with this battery, the charge and discharge cyclic test was sequentially carried out 30 times. As a result, the initial weight capacity density of the positive electrode layer at from 2.5 to 4.3 V at 25° C. was 160 mAh/g, and the average discharge voltage was 3.98 V and the capacity retention was 98.4% after 30 times of charge and discharge cycle.

Further, the other battery was charged for 10 hours at 4.3 V, and then disassembled in the argon grove box. The positive electrode sheet was taken out after charge, and after the positive electrode sheet was washed, it was punched out at a diameter of 3 mm, and then sealed in an aluminum capsule with EC. And then, it was heated at a rate of 5° C./min by using a scanning differential calorimeter, whereby the heat generation starting temperature was measured. As a result, the heat generation starting temperature of the 4.3 V charged material was 160° C.

Example 12

In Example 11, 42.40 g of a zirconium ammonium fluoride $(NH_4)_2ZrF_6$ aqueous solution having a Zr content of 4.4 mass % instead of the zirconium ammonium carbonate aqueous solution was mixed with 37.60 g of water, followed by stirring for 30 minutes to obtain an additional element aqueous solution having a pH of 3.3.

The above aqueous solution was added to the above mixture of cobalt hydroxide with lithium carbonate and formed into a slurry, and a positive electrode active material was synthesized in the same manner as in Example 11 to obtain $LiCo_{0.99}Zr_{0.01}O_{1.99}F_{0.01}$. The particle size distribution of the obtained lithium-containing composite oxide powder formed by agglomeration of primary particles was measured by using a laser scattering type particle size distribution measuring apparatus and as a result, the average particle size D50 was 17.2 μm, D10 was 6.9 μm, D90 was 26.0 μm, and a substantially spherical powder having a specific surface area of 0.30 m$^2$/g as measured by BET method, was obtained. With respect to this powder, an X-ray diffraction spectrum was obtained by using an X-ray diffraction apparatus (RINT 2100 model, manufactured by Rigaku Corporation). In powder X-ray diffraction using CuKα ray, the half value width of the diffraction peak on (110) plane in the vicinity of 2θ=66.5±1° was 0.107°. The press density of the above powder was 3.10 g/cm$^3$. Further, 10 g of the powder was dispersed in 100 g of pure water, and after filtration, the remaining alkali amount was determined by potentiometric titration with 0.1 N HCl and found to be 0.02 mass %.

By using the lithium-containing composite oxide powder, in the same manner as in Example 11, a positive electrode was produced, batteries were assembled, and the battery characteristics were measured. The initial weight capacity density of the positive electrode layer was 162 mAh/g, the average discharge voltage was 3.98 V and the capacity retention was 98.5% after 30 times of charge and discharge cycle. The heat generation starting temperature of the 4.3 V charged material was 168° C.

Example 13

Comparative Example

A lithium-containing oxide was synthesized in the same manner as in Example 11 except that no additional element solution was added. An aggregated LiCoO$_2$ powder having an average particle size D50 of 17.3 μm, D10 of 7.8 μm and D90 of 26.2 μm, and a specific surface area of 0.27 m$^2$/g as measured by BET method, was obtained by blending to result in LiCoO$_2$ after firing. With respect to the LiCoO$_2$ powder, an X-ray diffraction spectrum was obtained by using an X-ray diffraction apparatus (RINT 2100 model, manufactured by Rigaku Corporation). In powder X-ray diffraction using CuKα ray, the half value width of the diffraction peak on (110) plane in the vicinity of 2θ=66.5±1° was 0.110°. The press density of the obtained LiCoO$_2$ powder was 3.10 g/cm$^3$.

In the same manner as in Example 11, a positive electrode was produced, batteries were assembled, and the characteristics were measured. The initial weight capacity density of the positive electrode layer was 161 mAh/g, the average discharge voltage was 3.94 V and the capacity retention was 96.3% after 30 times of charge and discharge cycle. The heat generation starting temperature of the 4.3 V charged material was 158° C.

Example 14

Comparative Example

LiCo$_{0.99}$Zr$_{0.01}$O$_2$ was synthesized in the same manner as in Example 11 except that 2.51 g of zirconium oxide was used instead of the additional element solution in Example 11. The press density of this powder was 2.97 g/cm$^3$.

Further, in the same manner as in Example 11, a positive electrode was produced, batteries were assembled, and the characteristics were measured. The initial weight capacity density of the positive electrode layer was 161 mAh/g, the average discharge voltage was 3.93 V and the capacity retention was 97.1% after 30 cycles, and the heat generation starting temperature was 159° C.

Example 15

Comparative Example

The same operation as in Example 12 was carried out to synthesize a positive electrode active material except that 72.43 g of lithium carbonate, 2.64 g of lithium fluoride and 194.01 g of cobalt hydroxide were mixed, and that 2.51 g of zirconium oxide was used instead of the additional element solution, and as a result, LiCo$_{0.99}$Zr$_{0.01}$O$_{1.99}$F$_{0.01}$ was obtained. The press density of this powder was 2.95 g/cm$^3$. Further, 10 g of this powder was dispersed in 100 g of pure water, and after filtration, the remaining alkali amount was determined by potentiometric titration with 0.1 N HCl and found to be 0.02 mass %.

In the same manner as in Example 11, a positive electrode was produced, batteries were assembled, and the characteristics were measured. The initial weight capacity density of the positive electrode layer was 160 mAh/g, the average discharge voltage was 3.92 V and the capacity retention was 97.6% after 30 cycles, and the heat generation starting temperature was 162° C.

Example 16

LiAl$_{0.01}$Co$_{0.97}$Mg$_{0.01}$Zr$_{0.01}$O$_2$ was obtained in the same manner as in Example 12 except that 190.61 g of cobalt hydroxide and 76.24 g of lithium carbonate were mixed, and that as the additional liquid, an additional element solution having a pH of 3.5 obtained by adding 12.39 g of a zirconium ammonium carbonate (NH$_4$)$_2$[Zr(Co$_3$)$_2$(OH)$_2$] aqueous solution having a Zr content of 15.1 mass % added to a solution having 4.85 g of aluminum citrate, 1.97 of magnesium carbonate and 10.77 g of citric acid dissolved in 62.41 g of water, was used in Example 11. The press density of this powder was 3.06 g/cm$^3$.

Further, in the same manner as in Example 11, a positive electrode was produced, batteries were assembled, and the characteristics were measured. The initial weight capacity density of the positive electrode layer was 162 mAh/g, the average discharge voltage was 3.97 V and the capacity retention was 99.3% after 30 cycles, and the heat generation starting temperature was 173° C.

Example 17

Comparative Example

LiAl$_{0.01}$Co$_{0.97}$Mg$_{0.01}$Zr$_{0.01}$O$_2$ was obtained in the same manner as in Example 16 except that 1.20 g of magnesium hydroxide, 0.60 g of aluminum hydroxide and 2.53 g of zirconium oxide were used instead of the additional element solution. The press density of this powder was 2.95 g/cm$^3$.

Further, in the same manner as in Example 11, a positive electrode was produced, batteries were assembled, and the characteristics were measured. The initial weight capacity density of the positive electrode layer was 160 mAh/g, the average discharge voltage was 3.91 V and the capacity retention was 98.0% after 30 cycles, and the heat generation starting temperature was 162° C.

Example 18

100.35 g of LiCoO$_2$ synthesized in Example 13 and 30.86 g of the additional liquid prepared in Example 16 were mixed and formed into a slurry. The slurry from which the solvent was removed, was fired in the air at 900° C. for 12 hours to obtain Li$_{0.97}$Al$_{0.01}$Co$_{0.97}$Mg$_{0.01}$Zr$_{0.01}$O$_2$. The press density of this powder was 3.07 g/cm$^3$.

Further, in the same manner as in Example 11, a positive electrode was produced, batteries were assembled, and the characteristics were measured. The initial weight capacity density of the positive electrode layer was 161 mAh/g, the average discharge voltage was 3.96 V and the capacity retention was 99.1% after 30 cycles, and the heat generation starting temperature was 169° C.

Example 19

Comparative Example

In Example 18, 0.80 g of aluminum hydroxide, 0.60 g of magnesium hydroxide and 1.26 g of zirconium oxide were mixed instead of using the additional liquid, and firing was carried out in the air at 900° C. for 12 hours to obtain a lithium-lithium cobalt composite oxide of $Li_{0.97}Al_{0.01}Co_{0.97}Mg_{0.01}Zr_{0.01}O_2$. The press density of this powder was 2.92 g/cm³.

Further, in the same manner as in Example 11, a positive electrode was produced, batteries were assembled, and the characteristics were measured. The initial weight capacity density of the positive electrode layer was 159 mAh/g, the average discharge voltage was 3.92 V and the capacity retention was 97.0% after 30 cycles, and the heat generation starting temperature was 158° C.

Example 20

194.71 g of cobalt hydroxide, 1.20 g of magnesium hydroxide and 76.30 g of lithium carbonate were mixed and fired in the air at 950° C. for 12 hours to obtain a $LiCo_{0.99}Mg_{0.01}O_2$ powder. A powder mixture of 100 g of this powder and 0.80 g of aluminum hydroxide, was mixed with an aqueous solution having a pH of 9.0 obtained by mixing 6.20 g of zirconium ammonium carbonate having a Zr content of 15.1 mass % with 33.8 g of water, as an additional liquid, and formed into a slurry so that the composite oxide would be $LiAl_{0.01}Co_{0.97}Mg_{0.01}Zr_{0.01}O_2$ after firing. This slurry was dehydrated and fired in the air at 900° C. for 12 hours to obtained an aimed lithium-containing composite oxide. The press density of this powder was 3.09 g/cm³.

Further, in the same manner as in Example 11, a positive electrode was produced, batteries were assembled, and the characteristics were measured. The initial weight capacity density of the positive electrode layer was 161 mAh/g, the average discharge voltage was 3.97 V and the capacity retention was 99.0% after 30 cycles, and the heat generation starting temperature was 173° C.

Example 21

Comparative Example

A lithium-containing composite oxide was obtained in the same manner as in Example 20 except that 1.26 g of zirconium oxide was used instead of using zirconium ammonium carbonate, and the powder mixture was fired in the air at 900° C. for 12 hours to obtain a powder having a composition of $LiAl_{0.01}Co_{0.97}Mg_{0.01}Zr_{0.01}O_2$. The press density of this powder was 2.90 g/cm³.

Further, in the same manner as in Example 11, a positive electrode was produced, batteries were assembled, and the characteristics were measured. The initial weight capacity density of the positive electrode layer was 158 mAh/g, the average discharge voltage was 3.93 V and the capacity retention was 96.7% after 30 cycles, and the heat generation starting temperature was 157° C.

Example 22

In Example 16, based on 190.61 g of cobalt hydroxide, as an additional liquid, 12.39 g of a zirconium ammonium carbonate $(NH_4)_2[Zr(CO_3)_2(OH)_2]$ aqueous solution having a Zr content of 15.1 mass % was added to a solution having 4.80 g of aluminum citrate, 1.97 g of magnesium carbonate and 10.77 g of citric acid dissolved in 50.02 g of water. This additional element solution had a pH of 3.5. The obtained slurry was dehydrated in a dryer at 120° C. for 2 hours and mixed with 76.24 g of lithium carbonate, and the mixture was fired at 950° C. for 12 hours to obtain $LiAl_{0.01}Co_{0.97}Mg_{0.01}Zr_{0.01}O_2$. The press density of this powder was 3.08 g/cm³.

Further, in the same manner as in Example 11, a positive electrode was produced, batteries were assembled, and the characteristics were measured. The initial weight capacity density of the positive electrode layer was 160 mAh/g, the average discharge voltage was 3.96 V and the capacity retention was 99.1% after 30 cycles, and the heat generation starting temperature was 171° C.

Example 23

With 192.96 g of a cobalt oxyhydroxide powder having a cobalt content of 61.5%, an additional element solution having a pH of 3.2, obtained by adding 1.24 g of zirconium ammonium carbonate having a Zr content of 15.1% to a solution having 4.63 g of a basic aluminum lactate powder, 0.97 g of a magnesium carbonate powder and 8.51 g of citric acid dissolved in 64.65 g of water, was mixed. The obtained slurry was dehydrated in a dryer at 120° C. for 2 hours and mixed with 76.42 g of lithium carbonate, and the mixture was fired at 990° C. for 12 hours to obtain a lithium-containing composite oxide of $LiAl_{0.015}Co_{0.979}Mg_{0.005}Zr_{0.001}O_2$.

The lithium-containing composite oxide had an average particle size D50 of 13.1 μm, D10 of 6.8 μm and D90 of 18.5 μm, and a specific surface area of 0.30 m²/g as measured by BET method. Of this powder, the half value width of the diffraction peak on (110) plane in X-ray diffraction was 0.106, and the press density was 3.19 g/cm³.

Further, in the same manner as in Example 11, a positive electrode was produced, batteries were assembled, and the characteristics were measured. As a result, the initial capacity was 160 mAh/g, the average discharge voltage was 3.97 V and the capacity retention was 99.1% after 30 cycles, and the heat generation starting temperature was 175° C.

Example 24

With 195.48 g of a cobalt oxyhydroxide powder having a cobalt content of 61.5%, an additional element solution having a pH of 2.7, obtained by dissolving 4.63 g of a basic aluminum lactate powder, 0.97 g of a magnesium carbonate powder, 0.14 g of niobium hydrogenoxalate and 18.37 g of citric acid dissolved in 55.89 g of water, was mixed. The obtained slurry was dehydrated in a dryer at 120° C. for 2 hours and mixed with 76.35 g of lithium carbonate, and the mixture was fired at 990° C. for 12 hours to obtain a lithium-containing composite oxide of $LiAl_{0.015}Co_{0.979}Mg_{0.005}Nb_{0.001}O_2$.

The lithium-containing composite oxide had an average particle size D50 of 13.7 μm, D10 of 7.2 μm and D90 of 18.8 μm, and a specific surface area of 0.34 m²/g as measured by BET method. Of this powder, the half value width of the diffraction peak on (110) plane in X-ray diffraction was 0.113, and the press density was 3.07 g/cm³.

Further, in the same manner as in Example 1, a positive electrode was produced, batteries were assembled, and the characteristics were measured. As a result, the initial capacity was 159 mAh/g, the average discharge voltage was 3.98 V and the capacity retention was 99.4% after 30 cycles, and the heat generation starting temperature was 171° C.

Example 25

0.41 g of acetylacetone was added to 0.83 g of tantalum ethoxide, followed by reflux at 70° C. for 1 hour, and 2.48 g of ethanol was added to obtain a tantalum ethoxide acetylacetonate solution having a Ta content of 10 mass %.

Then, to a solution having 4.62 g of a basic aluminum lactate powder, 0.97 g of a magnesium carbonate powder and 18.35 g of citric acid dissolved in 52.34 g of water, the tantalum ethoxide acetylacetonate solution was added to obtain an additional element solution having a pH of 3.4. This solution and 195.31 g of a cobalt oxyhydroxide powder having a cobalt content of 61.5% were mixed. The obtained slurry was dehydrated in a dryer at 120° C. for 2 hours and mixed with 76.28 g of lithium carbonate, and the mixture was fired at 990° C. for 12 hours to obtain a lithium-containing composite oxide of $LiAl_{0.015}Co_{0.979}Mg_{0.005}Ta_{0.001}O_2$.

The lithium-containing composite oxide had an average particle size D50 of 14.0 μm, D10 of 7.4 μm and D90 of 18.7 μm, and a specific surface area of 0.33 $m^2$/g as measured by BET method. Of this powder, the half value width of the diffraction peak on (110) plane in X-ray diffraction was 0.113, and the press density was 3.04 g/$cm^3$.

Further, in the same manner as in Example 1, a positive electrode was produced, batteries were assembled, and the characteristics were measured. As a result, the initial capacity was 160 mAh/g, the average discharge voltage was 3.98 V and the capacity retention was 99.3% after 30 cycles, and the heat generation starting temperature was 172° C.

Industrial Applicability

According to the present invention, a process for producing a lithium-containing composite oxide for a positive electrode for a lithium secondary battery, which has a large volume capacity density and high safety and is excellent in the charge and discharge cyclic durability, a positive electrode for a lithium secondary battery containing the produced lithium-containing composite oxide and the like, and a lithium secondary battery, are provided.

The entire disclosures of Japanese Patent Application No. 2004-136082 filed on Apr. 30, 2004 and Japanese Patent Application No. 2004-267250 filed on Sep. 14, 2004 including specifications, claims and summaries are incorporated herein by reference in their entireties.

What is claimed is:

1. A process for producing a lithium-containing composite oxide for a positive electrode for a lithium secondary battery, the lithium-containing composite oxide being represented by the formula $Li_pQ_qN_xM_yO_2$ (wherein Q is at least one element selected from the group consisting of titanium and zirconium, N is Co, M is at least one element selected from the group consisting of Al, alkaline earth metal elements and transition metal elements other than Q, Co, Mn and Ni, $0.9 \leq p \leq 1.1$, $0 < q \leq 0.03$, $0.97 \leq x < 1.00$, $0 \leq y < 0.03$ and $q+x+y=1$), which comprises firing a mixture of a lithium source, an Q element source and an N element source, in an oxygen-containing atmosphere, wherein the Q element source is a Q element compound aqueous solution having a pH of from 0.5 to 11, wherein the Q element compound aqueous solution is selected from the group consisting of an aqueous solution of titanium lactate chelate, an aqueous solution of triethanolamine titanium chelate, an aqueous solution of zirconium ammonium carbonate and an aqueous solution of a halogenated zirconium ammonium, and said mixture is fired at from 950 to 1,080° C.

2. The process according to claim 1, wherein the Q element compound aqueous solution is at least one aqueous solution selected from the group consisting of an aqueous solution of titanium lactate chelate and an aqueous solution of triethanolamine titanium chelate, and having a pH of from 1.0 to 9.5.

3. The process according to claim 1, wherein the Q element compound aqueous solution is at least one aqueous solution selected from the group consisting of an aqueous solution of zirconium ammonium carbonate and an aqueous solution of a halogenated zirconium ammonium, and having a pH of from 2 to 11.

4. The process according to claim 1, wherein the lithium source, the Q element compound aqueous solution and the N element source, are mixed, the water medium is removed from the obtained mixture, and the mixture is fired at from 950 to 1,080° C. in an oxygen-containing atmosphere.

5. The process according to claim 1, wherein the Q element compound aqueous solution and the N element source, are mixed, the water medium is removed from the obtained mixture, and the mixture is mixed with the lithium source, and the obtained mixture is fired at from 950 to 1,080° C. in an oxygen-containing atmosphere.

6. The process according to claim 1, wherein a lithium composite oxide powder containing the N element source, is preliminarily prepared, the lithium composite oxide powder and the Q element compound aqueous solution, the water medium is removed from the obtained mixture, and the mixture is fired at from 950 to 1,080° C. in an oxygen-containing atmosphere.

7. The process according to claim 1, wherein the M element is present and the M element source is an M element compound aqueous solution.

8. The process according to claim 1, wherein the M element is present and the M element is at least one member selected from the group consisting of Hf, Mg, Cu, Sn, Zn and Al.

9. The process according to claim 1, wherein the M element is present and the M element is Al and Mg, the Al/Mg atomic ratio is from 1/3 to 3/1, and $0.005 \leq y \leq 0.025$.

10. The process according to claim 1, wherein the M element is present and the M element is Mg, the Q element/Mg atomic ratio is from 1/40 to 2/1, and $0.005 \leq y \leq 0.025$.

11. The process according to claim 1, wherein the integral breadth of the diffraction peak on (110) plane at $2\theta=66.5\pm1°$ of the lithium-containing composite oxide is from 0.08 to 0.14° as measured by means of X-ray diffraction in which CuKα is used as a radiation source, and the specific surface area is from 0.2 to 0.7 $m^2$/g.

12. The process according to claim 1, wherein the lithium-containing composite oxide has an average particle size of from 3 to 20 μm.

* * * * *